United States Patent
Guillemin et al.

(10) Patent No.: US 11,790,138 B2
(45) Date of Patent: Oct. 17, 2023

(54) METHOD OF DETERMINING THE WIND SPEED IN THE ROTOR PLANE USED FOR CONTROLLING A WIND TURBINE

(71) Applicant: IFP Energies nouvelles, Rueil-Malmaison (FR)

(72) Inventors: Fabrice Guillemin, Rueil-Malmaison (FR); Hoai-Nam Nguyen, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 326 days.

(21) Appl. No.: 17/173,045

(22) Filed: Feb. 10, 2021

(65) Prior Publication Data
US 2021/0279389 A1    Sep. 9, 2021

(30) Foreign Application Priority Data
Feb. 10, 2020    (FR) .................................... 20/01.276

(51) Int. Cl.
G06F 30/28      (2020.01)
F03D 17/00      (2016.01)
G01P 5/00       (2006.01)
G06F 111/08     (2020.01)

(52) U.S. Cl.
CPC .............. G06F 30/28 (2020.01); F03D 17/00 (2016.05); G01P 5/001 (2013.01); F05D 2260/81 (2013.01); G06F 2111/08 (2020.01)

(58) Field of Classification Search
None
See application file for complete search history.

(56) References Cited

U.S. PATENT DOCUMENTS 8,013,460 B2 *  9/2011  Kinzie ................... F03D 7/043
                                                 290/55
2006/0033338 A1  2/2006  Wilson

FOREIGN PATENT DOCUMENTS

CA    3 053 618 A1    9/2018
CN    101641856 A  *  2/2010  ............. H02K 16/00

OTHER PUBLICATIONS

Chien Wang and Ronald G. Prinn, Impact of the horizontal wind profile on the convective transport of chemical species, Journal of Geophysical Research, vol. 103, No. 017, pp. 22,063-22,071, Sep. 20, 1998 (Year: 1998).*
P. Towers and B. Li. Jones, Real-time wind field reconstruction from LiDAR measurements using a dynamic wind model and state estimation, Published online Nov. 21, 2014 in Wiley Online Library (wileyonlinelibrary.com). DOI: 10.1002/we.1824 (Year: 2014).*
Preliminary Search Report for FR 20 01 276, dated Oct. 14, 2020 (3 pages).

(Continued)

Primary Examiner — Matthew G Marini
(74) Attorney, Agent, or Firm — Fitch, Even, Tabin & Flannery LLP

(57) ABSTRACT

The present invention is a method of controlling a wind turbine by determining the wind speed in the plane of a rotor (PR) of a wind turbine (1), by measuring the rotational speed of the rotor, the angle of the blades and the generated power. The method according to the invention implements a dynamic wind turbine model, a dynamic wind model and an unscented Kalman filter.

20 Claims, 4 Drawing Sheets

(56) References Cited

OTHER PUBLICATIONS

Julier SJ et al: "Unscented Filtering and Nonlinear Estimation", Proceedings of the IEEE, IEEE. New York, us, vol. 92, No. 3, Mar. 1, 2004 (Mar. 1, 2004), pp. 401-422, XP011108672.
Hernandez Jordi et al: "Wind speed estimation in wind turbines using EKF: Application to experimental data", 2014 UKACC International Conference on Control (CONTROL), IEEE, Jul. 9, 2014 (Jul. 9, 2014).
Mohsen Nourbakhsh Soltani "Estimation of Rotor Effective Wind Speed: A Comparison" Jul. 2013 IEEE Transactions on Control Systems Technology, vol. 21, No. 4.

\* cited by examiner

[Fig 1]
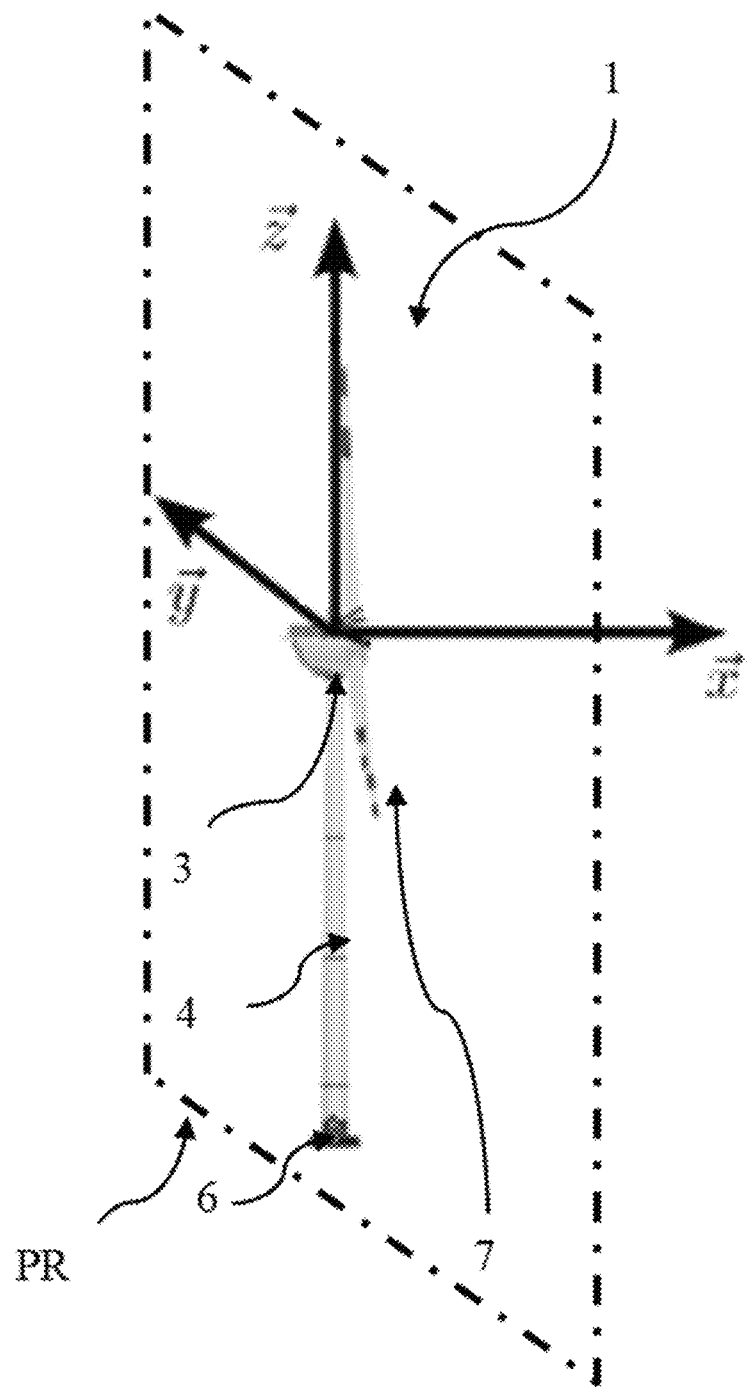

[Fig 2]
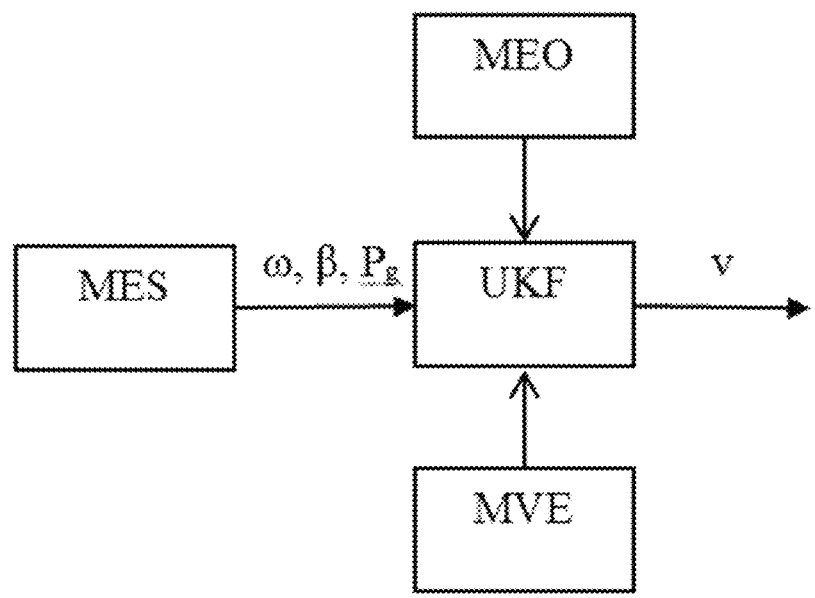
[Fig 3]
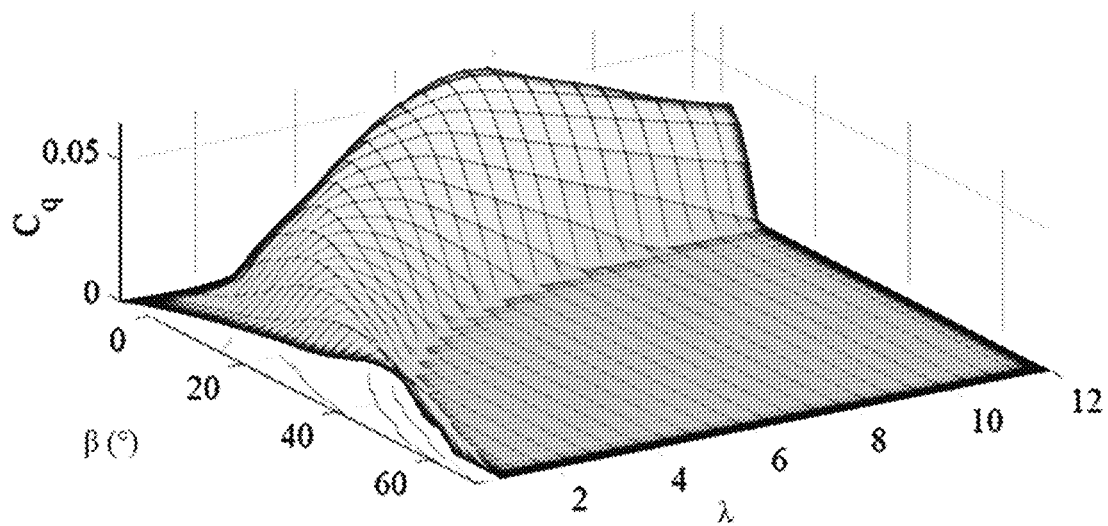

[Fig 4]
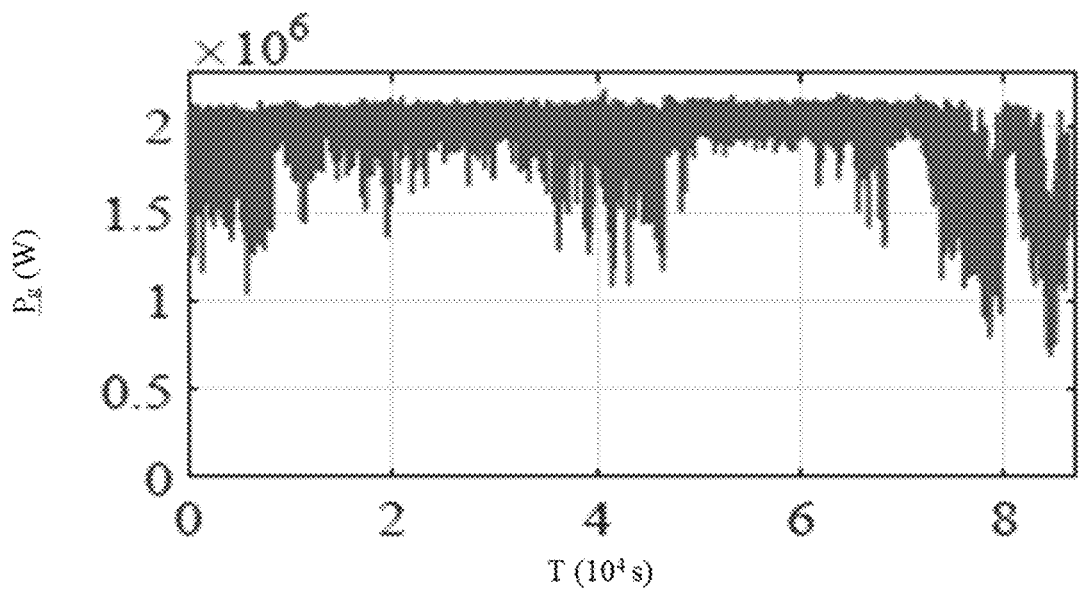
[Fig 5]
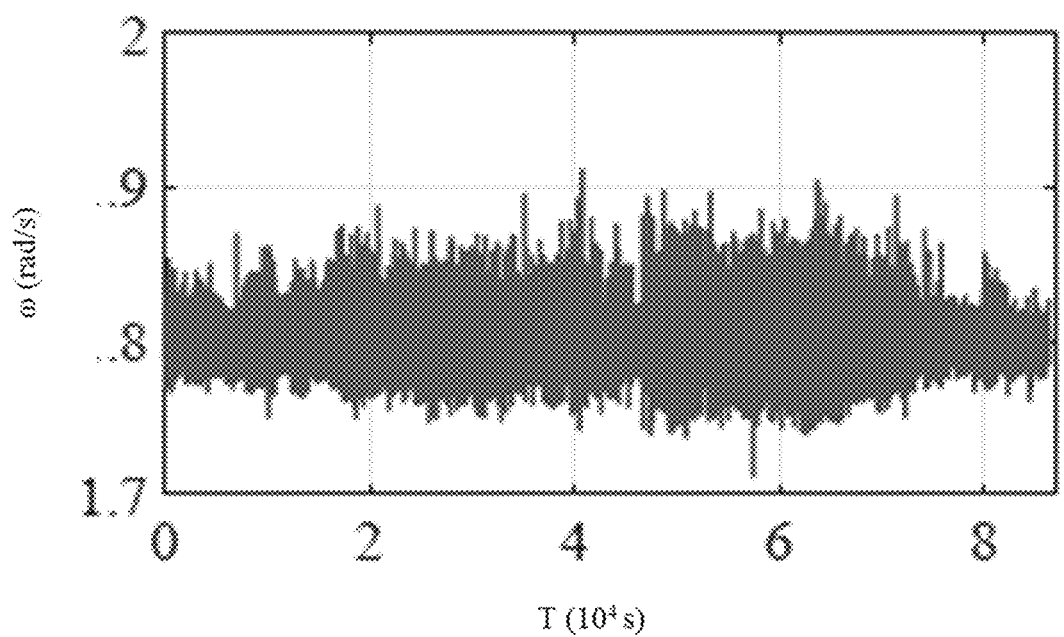

[Fig 6]
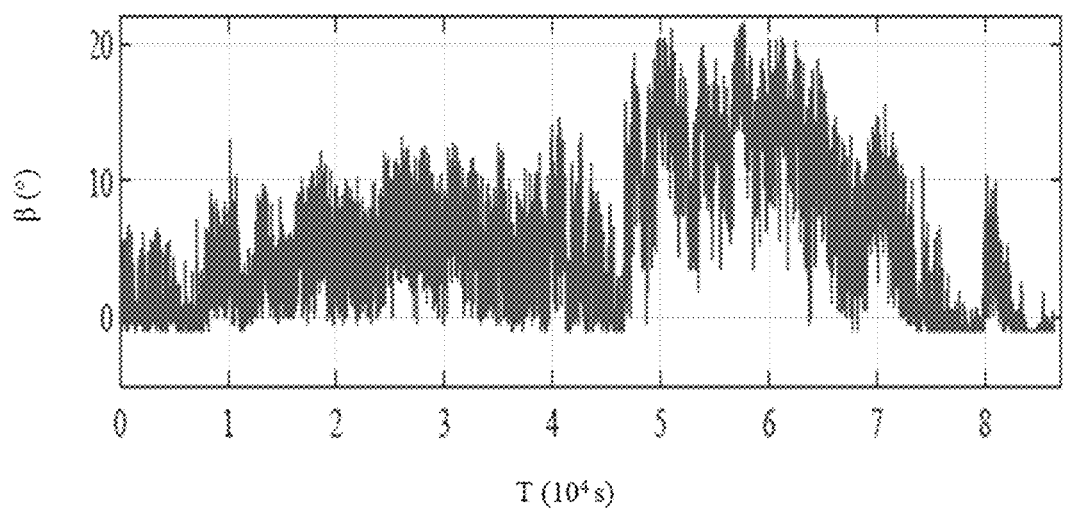
[Fig 7]
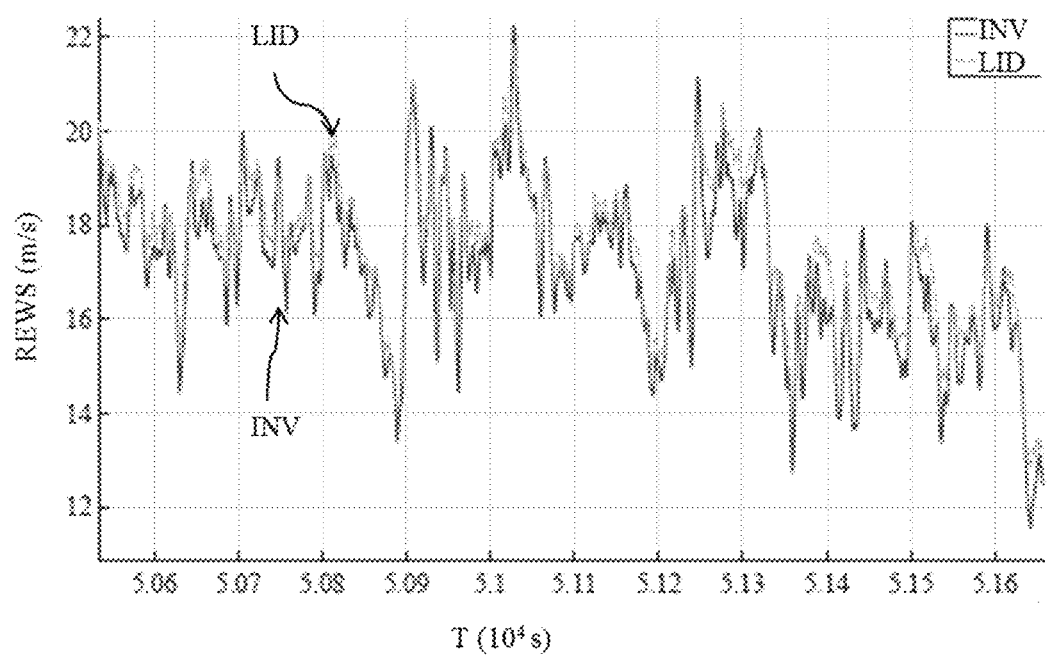

METHOD OF DETERMINING THE WIND SPEED IN THE ROTOR PLANE USED FOR CONTROLLING A WIND TURBINE

CROSS-REFERENCE TO RELATED APPLICATIONS

This application claims priority to French Patent Application No. 20/01.276, filed Feb. 10, 2020, the contents of which are incorporated herein by reference in their entirety.

BACKGROUND OF THE INVENTION

Field of the Invention

The present invention relates to the field of renewable energy and more particularly to the measurement of the resource of wind turbines, the wind, with wind prediction, turbine control (orientation, torque and speed regulation) and at least one of diagnosis and monitoring objectives.

Description of the Prior Art

A wind turbine converts the kinetic energy the wind into electrical or mechanical energy. For wind energy conversion, the wind invention is made up of the following elements:
- a tower allowing a rotor to be positioned at a sufficient height to enable motion thereof (necessary for horizontal-axis wind turbines) or the rotor to be positioned at a height enabling it to be driven by a stronger and more regular wind than at ground level. The tower generally houses part of the electrical and electronic components (modulator, control, multiplier, generator, etc.);
- a nacelle mounted at the top of the tower, housing mechanical, pneumatic and some electrical and electronic components necessary to operate the turbine. The nacelle can rotate to orient the rotor in the right direction;
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electrical generator) or to any other type of conversion machine that converts the energy recovered into electrical energy or any type of energy. The rotor is potentially provided with control systems such as a variable-angle blades or aerodynamic brakes,
- a transmission having two shafts (mechanical shaft of the rotor and mechanical shaft of the conversion machine) connected by a transmission (gearbox), which forms a kinematic chain between the mechanical shaft of the rotor and the mechanical shaft of the conversion machine.

Since the beginning of the 1990s, there has been renewed interest in wind power, in particular in the European Union where the annual growth rate is about 20%. This growth is attributed to the inherent possibility for carbon-emission-free electricity generation. In order to sustain this growth, the energy yield of wind turbines still needs to be further improved. The prospect of wind power production increase requires developing effective production tools and advanced control tools in order to improve the performance of the machines. Wind turbines are designed to produce electricity at the lowest possible cost. They are therefore generally built to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind to avoid damage to the wind turbine. All wind turbines are therefore designed with a power regulation system.

For power regulation, controllers have been designed for variable-speed aerogenerators. The purpose of the controllers is to maximize the electrical power recovered, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimation of a wind speed at one point. This imprecise technology does not enable measurement of an entire wind field or to know the three-dimensional components of the wind speed.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are essential for proper functioning of large wind turbines, especially now that their size and power is increasing (today 5 MW, soon 12 MW for offshore turbines). These sensors enable remote wind measurements, first allowing wind turbines to be calibrated so that they can deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it provides knowledge of the energy generating resource. This is important for wind turbine projects since it conditions the financial viability of the project.

A second application sets the sensor on the nacelle of the wind turbine in order to measure the wind field in front of the turbine while being nearly horizontally oriented. A priori, measuring the wind field in front of the turbine allowing obtaining knowledge in advance of the turbulence the wind turbine is going to encounter shortly thereafter. However, current wind turbine control and monitoring techniques do not allow to take account of a measurement performed by a LiDAR sensor by estimating precisely the wind speed at the rotor, in the rotor plane. Such an application is notably described in French patent application FR-3-013,777 corresponding to US published patent application 2015/-145,253.

However, a LiDAR sensor is an expensive sensor. Furthermore, since such a LiDAR sensor has only been developed relatively recently, it is still difficult to know, by converting raw data from the LiDAR sensor, how to exploit the wind field characteristics, such as wind speed, wind direction, wind shear, turbulence, induction factor, etc. LiDAR sensors thus require a complex implementation to determine the wind speed in the rotor plane. It is therefore necessary to determine the wind speed in the rotor plane in an inexpensive, reliable and directly usable manner, for at least one of control and diagnosis of the wind turbine.

SUMMARY OF THE INVENTION

The present invention determines, in real time, in an inexpensive and reliable manner, the wind speed in the rotor plane which is used in controlling the wind turbine. The present invention therefore relates to a method of determining the wind speed in the plane of a rotor of a wind turbine, by measuring the rotational speed of the rotor, the angle of the blades and the generated power. The method according to the invention implements a dynamic wind turbine model, a dynamic wind model and an unscented Kalman filter. Dynamic models enable reliable determination of the wind speed in the rotor plane. The unscented Kalman filter provides undisputed determination of the results. Furthermore, the method according to the invention does not use an expensive sensor.

The invention relates to a method of determining the wind speed in the rotor plane of a wind turbine, wherein the following steps are carried out:
  a) measuring the rotational speed of the rotor of the wind turbine, the inclination angle of the blades of the wind turbine and the power generated by a conversion machine of the wind turbine,
  b) constructing a dynamic model of the wind turbine relating the rotational speed of the rotor of the wind turbine to the wind speed in the rotor plane, to the inclination angle of the blades of the wind turbine and to the power generated by the conversion machine of the wind turbine,
  c) constructing a dynamic wind model by use of a second-order random walk model; and
  d) determining the wind speed in the plane of the rotor by use of an unscented Kalman filter in to the dynamic model of the wind turbine, to the dynamic wind model, and from the measurements of the rotational speed of the rotor, the inclination angle of the turbine blades and the power generated by the conversion machine of the wind turbine.

According to an embodiment, the dynamic wind model is expressed as:

$$\begin{cases} \begin{bmatrix} \frac{dv_1(t)}{dt} \\ \frac{dv_2(t)}{dt} \end{bmatrix} = \begin{bmatrix} 0 & 1 \\ 0 & 0 \end{bmatrix} \begin{bmatrix} v_1(t) \\ v_2(t) \end{bmatrix} + \begin{bmatrix} 0 \\ \eta(t) \end{bmatrix} \\ v(t) = \begin{bmatrix} 1 & 0 \end{bmatrix} \begin{bmatrix} v_1(t) \\ v_2(t) \end{bmatrix} \end{cases}$$

with $v_1(t)$ being the wind speed in the rotor plane, $v_2(t)$ being a wind speed derivative in the rotor plane, $\eta(t)$ being a white noise with zero mean and $v(t)=v_1(t)$.

Advantageously, the dynamic model of the wind turbine is written:

$$\frac{d\omega(t)}{dt} = \frac{1}{2J}\pi\rho R^3 C_q(\beta(t), \lambda(t))v(t)^2 - \frac{P_g(t)}{J\omega(t)} - \frac{1}{J}T_i(t)$$

with $\omega(t)$ being rotational speed of the rotor, J being a moment of inertia of a kinematic chain of the wind turbine, $\rho$ being the air density, R being the radius of the rotor, $C_q$ being a power coefficient, $\beta(t)$ being an inclination angle of the blades, $\lambda(t)$ being a ratio of the blade tip speed to the wind speed in the rotor plane, $P_g(t)$ being power generated by the conversion machine of the wind turbine, $v(t)$ being the wind speed in the rotor plane and $T_i(t)$ being the loss torque along the kinematic chain of the wind turbine.

Preferably, the loss torque $T_i(t)$ is considered to be noise.

Advantageously, the power coefficient $C_q$ is obtained by use of a map of the wind turbine.

According to an aspect, the method determines a longitudinal component of an average wind speed in the rotor plane.

According to an implementation, the unscented Kalman filter is applied to an equation of state:

$$\begin{cases} \begin{bmatrix} \frac{dx_1(t)}{dt} \\ \frac{dx_2(t)}{dt} \\ \frac{dx_3(t)}{dt} \end{bmatrix} = \begin{bmatrix} \frac{1}{2J}\pi\rho R^3 C_q\left(\beta(t), \frac{Rx_1(t)}{x_2(t)}x_2(t)^2 - \frac{P_g(t)}{Jx_1(t)}\right) \\ x_3(t) \\ 0 \end{bmatrix} + \begin{bmatrix} \mu_1(t) \\ 0 \\ \mu_2(t) \end{bmatrix} \\ y(t) = \begin{bmatrix} 1 & 0 & 0 \end{bmatrix} \begin{bmatrix} x_1(t) \\ x_2(t) \\ x_3(t) \end{bmatrix} + \xi(t) \end{cases}$$

with $$x_1(t) = \omega(t),\ x_2(t) = v(t),\ x_3(t) = \frac{dv(t)}{dt},$$

$\omega(t)$ being the rotational speed of the rotor, J being a moment of inertia of the kinematic chain of the wind turbine, $\rho$ being a air density, R being a radius of the rotor, $C_q$ being a power coefficient, $\beta(t)$ being an inclination angle of the blades, $P_g(t)$ being the power generated by the conversion machine of the wind turbine, $v(t)$ being the wind speed in the rotor plane, $\mu_1(t)$ and $\mu_2(t)$ being independent white noises with a zero mean, $y(t)$ being the measured output identified at the rotor speed $\omega(t)$ corrupted by a white noise $\xi(t)$.

According to an embodiment, the wind speed is determined by carrying out the following steps:
  i) initializing $k=0$, the state vector $\hat{x}_n(0|0)=m(0)$ and a state of a covariance matrix $P(0|0)=P_0$,
  ii) at any time k different from 0, acquiring the measurements $y(k)$, and
  iii) at any time k differing from 0, determining wind speed $v(k)$ in the rotor plane by use of the following equations:

$$K(k) = P(k \mid k-1)C^T(CP(k \mid k-1)C^T + R)^{-1}$$

$$\begin{cases} x(k \mid k) = x(k \mid k-1) + K(k)(y(k) - Cx(k \mid k-1)) \\ P(k \mid k) = (I_3 - K(k)C)P(k \mid k-1) \end{cases}$$

$$v(k) = \begin{bmatrix} 0 & 1 & 0 \end{bmatrix}\hat{x}$$

with K being the Kalman filter gain, P being the covariance of a Gaussian noise $\mu$, $P(k|k-1)$ being the error variance from the measurements of the time $k-1$, $P(k|k)$ being the error variance from the measurements of the time k, $x(k|k)$ being the estimation of $x(k)$ from the measurements of time k, $x(k|k-1)$ being the estimation of $x(k)$ from the measurements of time $k-1$, R being the covariance of a Gaussian noise $\xi$, $C=[1\ 0\ 0]$, $I_3$ being the identity matrix of size 3.

The invention further relates to a method of controlling a wind turbine. This method comprises the following steps:

a) determining the wind speed in the rotor plane of the wind turbine by use of the method according to one of the above features, and b) controlling the wind turbine according to the wind speed in the rotor plane of the wind turbine.

Furthermore, the invention relates to a computer program product comprising code instructions for carrying out steps of a method according to one of the above features, when the program is executed on at least one of a control and diagnosis unit of the wind turbine.

The invention also relates to a wind turbine comprising measuring the rotational speed of the rotor, measuring the inclination angle of the wind turbine blades, measuring the power generated by the conversion machine of the wind turbine and determining the wind speed in the rotor plane of the wind turbine able to implement the method according to any one of the above features.

According to an embodiment of the invention, the wind turbine comprises a real-time control and data acquisition system including measuring the rotational speed of the rotor, the measuring the inclination angle of the wind turbine blades and the measuring of the power generated by the conversion machine of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein:

FIG. 1 illustrates a wind turbine according to an embodiment of the invention;

FIG. 2 illustrates the steps of the method according to an embodiment of the invention;

FIG. 3 illustrates an example of a map of power coefficient $C_q$;

FIG. 4 illustrates a curve of the power generated by an (electrical) conversion machine as a function of time, measured for an application example;

FIG. 5 illustrates a curve of the rotational speed of the rotor as a function of time, measured for the example of FIG. 4;

FIG. 6 illustrates a curve of the inclination angle of the blades as a function of time, measured for the example of FIGS. 4 and 5; and FIG. 7 illustrates curves of the wind speed in the rotor plane as a function of time, obtained with the method according to an embodiment of the invention and by use of a LiDAR sensor, for the example of FIGS. 4 to 6.

DETAILED DESCRIPTION OF THE INVENTION

The present invention relates to a method of determining in real time the wind speed in the rotor plane of a wind turbine.

FIG. 1 schematically shows, by way of non-limitative example, a horizontal-axis wind turbine 1 for the method according to an embodiment of the invention. Conventionally, a wind turbine 1 converts the kinetic energy of the wind into electrical or mechanical energy. For wind energy conversion, it is made up of the following elements:

a tower 4 allowing a rotor (not shown) to be positioned at a sufficient height to enable motion thereof (necessary for horizontal-axis wind turbines) or allowing this rotor to be positioned at a height enabling it to be driven by a stronger and more regular wind than at ground level 6. Tower 4 generally houses part of the electrical and electronic components (modulator, control, multiplier, generator, etc.);

a nacelle 3 mounted at the top of tower 4, housing mechanical, pneumatic and some electrical and electronic components (not shown) necessary for operating the conversion machine. Nacelle 3 can rotate to orient the machine in the right direction;

the rotor, fastened to the nacelle, comprising blades 7 (generally three) and the hub of the wind turbine. The rotor is driven by the energy from the wind and it is connected by a mechanical shaft, directly or indirectly (via a gearbox and mechanical shaft system), to an electrical machine (electrical generator) or to any other conversion machine (hydraulic or pneumatic machine for example) that converts the energy recovered into electrical energy or any type of energy (hydraulic or pneumatic for example). The rotor is potentially provided with control systems such as a variable-angle blades or aerodynamic brakes, a transmission (not shown) having two connected shafts (mechanical shaft of the rotor and mechanical shaft of the conversion machine), thus forming a kinematic chain between the mechanical shaft of the rotor and the mechanical shaft of the conversion machine.

This figure also shows axes x, y and z. The reference point of this coordinate system is the center of the rotor. Direction x is the longitudinal direction corresponding to the direction of the rotor axis, upstream from the wind turbine. Direction y, perpendicular to direction x, is the lateral direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR, it is defined by directions y, z for a zero value of x.

According to the invention, the method for determining the wind speed comprises the following steps:

1) measurements;
2) construction of the dynamic wind turbine model;
3) construction of the dynamic wind model; and
4) determination of the wind speed.

Steps 1) and 4) can be carried out in real time. Steps 2) and 3) can be carried out beforehand and offline. These steps are described in detail in the rest of the description.

FIG. 2 schematically illustrates, by way of non-limitative example, the steps of the method of determining the wind speed according to an embodiment of the invention. A dynamic wind turbine model MEO relating the rotational speed of the rotor to the wind speed in the rotor plane, the inclination angle of the blades and the power generated by the conversion machine can be constructed beforehand. Furthermore, a dynamic wind model MVE can be constructed beforehand. The method also involves a step of measuring MES the rotational speed of the rotor w, the inclination angle of the blades β and the power $P_g$ generated by the conversion machine. An unscented Kalman filter UKF is then applied to dynamic wind turbine model MEO, dynamic wind model MVE and measurements ω, β, $P_g$. The unscented Kalman filter allows determination of the wind speed in the rotor plane v.

1. Measurements

The following measurements are performed in this step:
measuring rotational speed of the rotor,
measuring inclination angle of the blades, and measuring the power generated by the conversion machine (in other words, the power generated by the wind turbine).

According to an embodiment of the invention, at least one of the measurements can be obtained from a real-time control and data acquisition system (SCADA: Supervisory Control And Data Acquisition). A SCADA system is a large-scale remote management system providing processing in real time of a large number of remote measurements and controlling technical equipment from a distance. It is an industrial technology in the field of instrumentation whose implementations may be considered as instrumentation structures including a middleware type layer. Preferably, all the measurements can be obtained from the SCADA system, which facilitates the implementation of the method with no particular instrumentation. Furthermore, the SCADA system can account for at least one other measurement to make determination of the wind speed in the rotor plane more precise. These measurements can notably be temperatures, electrical data, vibrations, etc. Temperatures can provide information about effective mechanical losses and they therefore allow modelling of the wind turbine to be refined. Accelerometry, combined with a sufficiently fine and relevant modal and vibrational understanding of the structure, allow going back to an estimation of the wind and turbulence conditions impacting the wind turbine.

Alternatively, at least one of the measurements can be obtained by a dedicated sensor. For this embodiment at least one of:
 a rotor angular rotation sensor used for measuring the rotational speed of the rotor; and
 a blade angle sensor used for measuring the inclination angle of the blades; and
 a known and controlled voltage sensor used for measuring the power generated by the conversion machine and an electrical current sensor used for measuring the current delivered by the generator.

2. Construction of the Dynamic Wind Turbine Model

This step constructs a dynamic wind turbine model relating the rotational speed of the rotor to the wind speed in the rotor plane, the inclination angle of the wind turbine blades and the power generated by the conversion machine of the wind turbine. A dynamic wind turbine model is understood to be a model obtained by applying fundamental dynamics principles to the wind turbine.

According to an embodiment of the invention, the dynamic wind turbine model can be written:

$$\frac{d\omega(t)}{dt} = \frac{1}{2J}\pi\rho R^3 C_q(\beta(t), \lambda(t))v(t)^2 - \frac{P_g(t)}{J\omega(t)} - \frac{1}{J}T_l(t)$$

with ω(t) being the rotational speed of the rotor, J being the moment of inertia of the kinematic chain of the wind turbine, ρ being the air density, R being the radius of the rotor, $C_q$ being the power coefficient, β(t) being the inclination angle of the blades, λ(t) being the ratio of the blade tip speed to the wind speed in the rotor plane (i.e.

$$\lambda(t) = \frac{R\omega(t)}{v(t)}),$$

$P_g(t)$ being the power generated by the conversion machine of the turbine, v(t) being the wind speed in the rotor plane and $T_l(t)$ being the torque loss along the kinematic chain of the wind turbine. Preferably, for this embodiment, loss torque $T_l(t)$ can be considered to be noise. Thus, determination of the wind speed in the rotor plane is simplified. Alternatively, loss torque $T_l(t)$ can be measured.

According to an implementation of this embodiment, the power coefficient $C_q$ can be obtained from a map of the wind turbine. Such a map relates the power coefficient $C_q$ to inclination angle β of the blades and to the ratio of the blade tip speed to the wind speed in the rotor plane A. According to a non-limitative example, the map can be constructed beforehand using an aerodynamic model of the wind turbine being considered. FIG. 3 schematically illustrates, by way of non-limitative example, an example of such a map relating the power coefficient $C_q$ as a function of the inclination angle β of the blades (in degrees) and the ratio A of the blade tip speed to the wind speed in the rotor plane.

Indeed, the dynamic wind turbine model according to this embodiment can be obtained from the equation of the fundamental principles of dynamics:

$$J\frac{d\omega(t)}{dt} = T_r(t) - T_g(t) - T_l(t)$$

with ω(t) being the rotational speed of the rotor, J being the moment of inertia of the kinematic chain of the wind turbine, Tr(t) being the aerodynamic torque produced by the rotor, Tg(t) being the torque generated by the conversion machine and TIM being the loss torque along the kinematic chain of the wind turbine.

In this equation, the aerodynamic torque can be written:

$$T_r(t) = \frac{1}{2}\pi\rho R^3 C_q(\beta(t), \lambda(t))v(t)^2$$

with ρ being the air density, R being the radius of the rotor, $C_q$ being the power coefficient, β(t) being the inclination angle of the blades, λ(t) being the ratio of the blade tip speed to the wind speed in the rotor plane (that is $$\lambda(t) = \frac{R\omega(t)}{v(t)}),$$

and v(t) being the wind speed in the rotor plane.

Furthermore, the torque generated by the conversion machine Tg can be expressed as:

$$T_g(t) = \frac{P_g(t)}{\omega(t)}$$

with ω(t) being the rotational speed of the rotor and $P_g(t)$ being the power generated by the conversion machine of the wind turbine.

The combination of these equations allows obtaining the dynamic wind turbine model described above.

The method according to the invention is not limited to this dynamic model of the wind turbine, and it can be implemented for any other dynamic model of the wind turbine.

3. Construction of the Dynamic Wind Model

This step constructs a dynamic model of the wind by use of a second-order random walk model. A dynamic wind model is a model that represents the evolution of the wind as a function of time. A random walk model is a model having discrete dynamics of a succession of random time intervals. For such a model, the future of the system depends on its present state but not on the past thereof. Using a random walk model provides good wind modelling, and such a model is suitable for representing smooth curves with a squared second derivative. Such a model does not require prior knowledge of wind characteristics such as average speed, turbulence, etc.

According to an embodiment of the invention, the dynamic wind model can be expressed as:

$$\begin{cases} \begin{bmatrix} \frac{dv_1(t)}{dt} \\ \frac{dv_2(t)}{dt} \end{bmatrix} = \begin{bmatrix} 0 & 1 \\ 0 & 0 \end{bmatrix} \begin{bmatrix} v_1(t) \\ v_2(t) \end{bmatrix} + \begin{bmatrix} 0 \\ \eta(t) \end{bmatrix} \\ v(t) = \begin{bmatrix} 1 & 0 \end{bmatrix} \begin{bmatrix} v_1(t) \\ v_2(t) \end{bmatrix} \end{cases}$$

with $v_1(t)$ being the wind speed in the rotor plane, $v_2(t)$ being the wind speed derivative in the rotor plane and $n(t)$ being a white noise with a zero mean.

4. Determination of the Wind Speed

This step determines the wind speed in the rotor plane of the wind turbine by use of an unscented Kalman filter (UKF). The unscented Kalman filter is applied to the dynamic wind turbine model constructed in step 2) and to the dynamic wind model constructed in step 3), and it accounts for the measurements performed in step 1). The unscented Kalman filter is a filtering algorithm that uses a system model for estimating the current hidden state of a system, then it corrects the estimation using the available measurements. The philosophy of UKF differs from the extended Kalman filter in that it uses the unscented transform to directly approximate the mean and the covariance of the target distribution. The unscented Kalman filter can comprise the steps of state prediction and measurement correction with these two steps being preceded by a prior step of calculating the "sigma points". The sigma points are a set of samples calculated to allow the mean and variance information to be propagated precisely through the space of a nonlinear function.

Such a filter is thus well suited for rapidly determining the wind speed in the rotor plane.

According to an embodiment of the invention, it is possible to determine in this step the longitudinal component of the average wind speed in the rotor plane, denoted by REWS (Rotor Equivalent Wind Speed), which corresponds to the operating and production state of the wind turbine at a given time. It is a wind speed commonly used for at least one of control and monitoring of a wind turbine.

According to an implementation of the invention, the unscented Kalman filter can be applied to the following equation of state:

$$\begin{cases} \begin{bmatrix} \frac{dx_1(t)}{dt} \\ \frac{dx_2(t)}{dt} \\ \frac{dx_3(t)}{dt} \end{bmatrix} = \begin{bmatrix} \frac{1}{2J}\pi\rho R^3 C_q\left(\beta(t), \frac{Rx_1(t)}{x_2(t)}\right)x_2(t)^2 - \frac{P_g(t)}{Jx_1(t)} \\ x_3(t) \\ 0 \end{bmatrix} + \begin{bmatrix} \mu_1(t) \\ 0 \\ \mu_2(t) \end{bmatrix} \\ y(t) = \begin{bmatrix} 1 & 0 & 0 \end{bmatrix} \begin{bmatrix} x_1(t) \\ x_2(t) \\ x_3(t) \end{bmatrix} + \xi(t) \end{cases}$$

with $$x_1(t) = \omega(t), x_2(t) = v(t), x_3(t) = \frac{dv(t)}{dt},$$

ω(t) being the rotational speed of the rotor, J being the moment of inertia of the kinematic chain of the wind turbine, ρ being the air density, R being the radius of the rotor, $C_q$ being the power coefficient, β(t) being the inclination angle of the blades, $P_g(t)$ being the power generated by the conversion machine of the wind turbine, v(t) being the wind speed in the rotor plane, $\mu_1(t)$ and $\mu_2(t)$ being independent white noises with a zero mean, y(t) being the measured output identified at the rotor speed ω(t) corrupted by a white noise ξ(t).

In other words: y(t)=ω(t)+ξ(t).

This equation of state can be obtained by combining the dynamic models of the wind turbine and of the wind respectively determined in the previous steps.

With this equation of state, the problem of estimating the wind speed in the rotor plane becomes the problem of estimating the state, that is the unknown state x(t)=[$x_1(t)$ $x_2(t)$ $x_3(t)$]T at each sampling instant by use of this equation and of measured output y(t).

The unscented Kalman filter can be implemented by discretizing the equation of state by use of a Eulerian discretization method. It is then obtained a relationship written on:

$$\begin{cases} x(k) = f(x(k-1), \beta(k-1), P_g(k-1)) + T_s\mu(k-1) \\ y(k) = Cx(k) + \xi(k) \end{cases}$$

with $$x(k) = \begin{bmatrix} x_1(t) \\ x_2(t) \\ x_3(t) \end{bmatrix}, \mu(k) = \begin{bmatrix} \mu_1(t) \\ 0 \\ \mu_2(t) \end{bmatrix}, C = \begin{bmatrix} 1 & 0 & 0 \end{bmatrix},$$

$$f(x(k), \beta(k), P_g(k)) = \begin{bmatrix} x_1(k) + \frac{T_s}{2J}\pi\rho R^3 C_q\left(\beta(k), \frac{Rx_1(k)}{x_2(k)}\right)x_2(k)^2 - \frac{P_g(k)}{Jx_1(k)} \\ x_2(k) + T_s x_3(k) \\ x_3(k) \end{bmatrix}$$

with $T_s$ being the sampling period.

In this discretized state model, it may be assumed that μ(t) and ξ(t) are Gaussian noises with zero mean having the respective covariance matrices Q and R.

It is noted:

x(k|k−1)

is the estimation of x(k) from the measurements of time k−1.

x(k|k)

is the estimation of x(k) from the measurements of time k.

P(k|k−1)

is the error variance from the measurements of time k−1.

P(k|k)

is the error variance from the measurements of time k.

For the given state estimation x(k−1|k−1) and the given error variance estimation P(k−1|k−1) at the time k−1, there are two steps in the UKF which are prediction and correction.

After the correction step at the time k−1, the distribution of x(k−1) can be expressed as follows:

x(k−1)∼$\mathcal{N}$ (x(k−1|k−1),P(k−1|k−1))

with $\mathcal{N}$ designating a Gaussian distribution.

The sigma points related to the mean c(k−1|k−1) and to the covariance matrix P(k−1|k−1) can be calculated as follows:

$$\begin{cases} \chi_0 = x(k-1 \mid k-1) \\ \chi_i = x(k-1 \mid k-1) + \sqrt{n+\lambda}\, S_i, \; i = \overline{1,n} \\ \chi_{i+n} = x(k-1 \mid k-1) - \sqrt{n+\lambda}\, S_i, \; i = \overline{1,n} \end{cases}$$

In this case, n=3 and Si is the i-th column of S with:

$$SS^T = P(k-1 \mid k-1).$$

The sigma points are propagated in the equation of state as follows:

$$\gamma_i(k) = f(x_i, \beta(k-1), P_g(k-1))$$

with $\gamma_i$ the realizations of x(k|k−1) for any i ranging from 0 to 2n.

The next step calculate the predicted mean and the predicted covariance P(k|k−1) by use of:

$$\begin{cases} x(k \mid k-1) = \sum_{i=0}^{2n} W_i^m \gamma_i, \\ P(k \mid k-1) = \sum_{i=0}^{2n} W_i^c (\gamma_i - x(k \mid k-1))(\gamma_i - x(k \mid k-1))^T + T_s^2 Q \end{cases}$$

Given that the output equation is linear, the correction step is similar to that of a linear Kalman filter. The Kalman gain can be calculated as follows:

$$K(k) = P(k \mid k-1) C^T (CP(k-1) C^T + R)^{-1}$$

The state estimation x(k|k) and the covariance estimation P(k|k) at the time k can then be calculated with:

$$\begin{cases} x(k \mid k) = x(k \mid k-1) + K(k)(y(k) - Cx(k \mid k-1)) \\ P(k \mid k) = (I_3 - K(k)C) P(k \mid k-1) \end{cases}$$

with $I_3$ the identity matrix of size 3.

Once the state estimation $\hat{x} = x(k|k)$ is determined, the wind speed in the rotor plane can be calculated by implementing: $v(k) = [0\ 1\ 0]\hat{x}$.

The present invention also relates to a method of controlling at least one wind turbine. The following steps can be carried out for this method:
  determining the wind speed in the rotor plane of the wind turbine by use of the method of determining the wind speed according to any one of the above variants or variant combinations; and
  controlling the wind turbine according to the wind speed in the rotor plane of the wind turbine.

Precise real-time prediction of the wind speed in the rotor plane of the wind turbine allows suitable wind turbine control in terms of minimization of the effects on the turbine structure and maximization of the recovered power. Indeed, this control enables adaptation of the turbine equipments so that the turbine is in the optimum configuration for this wind.

According to an implementation of the invention, the inclination angle of at least one of the blades, the electrical recovery torque of the wind turbine generator and the orientation of the nacelle can be controlled as a function of the wind speed and direction. Preferably, the individual inclination angle of the blades can be controlled. Other types of regulation devices can be used. Controlling the blade inclination allows to optimize energy recovery as a function of the incident wind on the blades.

According to an embodiment of the invention, at least one of the inclination angle of the blades and the electrical recovery torque can be determined by use of wind turbine maps as a function of the wind speed at the rotor. For example, the control method described in French patent application FR-2,976,630 A1 corresponding to US published patent application 2012-/0.32.1.463 can be applied.

The present invention further relates to method for at least one of monitoring and diagnosis of at least one wind turbine. The following steps can be carried out for this method:
  determining the wind speed in the rotor plane of the wind turbine by use of the method of determining the wind speed according to any one of the above variants or variant combinations; and
  at least one of monitoring and diagnosing the operation of the wind turbine according to the wind speed in the rotor plane.

At least one of monitoring and diagnosis can for example correspond to the mechanical strain undergone by the structure of the wind turbine according to the wind speed in the rotor plane of the wind turbine.

Furthermore, the invention relates to a computer program product comprising code instructions for carrying out the steps of one of the methods described above (method of determining the wind speed, control method, diagnosis method). The program is executed on at least one of a wind turbine control and a diagnosis unit.

The invention also relates to a wind turbine, notably an offshore (at sea) or an onshore (on land) wind turbine. The wind turbine is equipped for measuring the rotation of the rotor, for measuring the inclination angle of the blades, and for measuring the power generated by the conversion machine. Moreover the wind turbine comprises an apparatus for determining the wind speed in the rotor plane able to implement the method of determining the wind speed according to any one of the above variants or variant combinations. According to an embodiment, the wind turbine can be similar to the wind turbine illustrated in 1.

According to an embodiment of the invention, the wind turbine can comprise a real-time control and data acquisition system (SCADA) including at least one measuring apparatus from among the apparatus for measuring the rotation of the rotor, the apparatus for measuring the inclination angle of the blades and the apparatus for measuring the power generated by the conversion machine. Preferably, the SCADA system can have all these measuring apparatus. Moreover, the SCADA system can comprise additional measuring apparatus (for example temperature, electric data, . . . ) allowing determination of the wind speed in the rotor plane to be more precise.

Alternatively, the wind turbine can comprise at least one sensor for carrying out at least one of these measurements, such as:
  at least one of a rotor angular rotation sensor for measuring the rotational speed of the rotor; r
  a blade angle sensor for measuring the inclination angle of the blades; and
  a known and controlled voltage sensor for measuring the power generated by the conversion machine and a current sensor for measuring the current delivered by the generator.

For the embodiment of the control method, the wind turbine can comprise a control, for example for control of the inclination angle (or pitch angle) of at least one blade of the wind turbine or of the electrical torque, for implementing the control method according to the invention.

The invention is not limited to the embodiments of the methods described above by way of example and that it encompasses any variant embodiment.

Example

The features and advantages of the method according to the invention will be clear from reading the application example hereafter.

The example relates to the determination of the wind speed REWS (Rotor Equivalent Wind Speed) in the rotor plane of the wind turbine, corresponding to the operating and production state of the wind turbine at a given time. The wind turbine is equipped with a SCADA system providing measurements of the rotation of the rotor, measurements of the power generated by the conversion machine, an electrical machine, and measurements of the inclination angle of the blades.

FIG. 4 illustrates the measurements of the power $P_g$ in W generated by the conversion machine (an electrical machine in this example) as a function of time T in s.

FIG. 5 shows the measurements of the rotational speed w of the rotor in rad/s as a function of time T in s.

FIG. 6 shows the measurements of the inclination angle $\beta$ of the blades in degrees as a function of time T in s.

Applying the method according to an embodiment of the invention allows determination of wind speed REWS in the rotor plane. This speed determined by the invention is compared with the wind speed REWS in the rotor plane obtained by of a four-beam LiDAR sensor positioned on the nacelle of the wind turbine.

FIG. 7 shows the two wind speed curves REWS as a function of time T in s obtained with the two methods with the invention denoted by INV and the LiDAR sensor (curve denoted by LID). It is noted that the two curves are nearly superposed, which shows that the invention, although it does not use an expensive sensor, allows determination of with precision the wind speed in the rotor plane of the wind turbine.

The invention claimed is:

1. A method of controlling a wind turbine comprising steps of:
   a) measuring rotational speed of a rotor of the wind turbine, an inclination angle of at least one blade of the wind turbine and power generated by a conversion machine of the wind turbine;
   b) constructing a dynamic model of the wind turbine relating the rotational speed of the rotor of the wind turbine to the wind speed in a rotor plane to the inclination angle of the at least one blade of the wind turbine and to the power generated by the conversion machine of the wind turbine;
   c) constructing a dynamic wind model using a second-order random walk model which has a succession of random time intervals;
   d) determining the wind speed in the rotor plane by using an unscented Kalman filter applied to the dynamic model of the wind turbine, to the dynamic wind model, and from the measuring the rotational speed of the rotor, the inclination angle of at least one of the turbine blades and the power generated by the conversion machine of the wind turbine; and
   e) controlling the wind turbine according to the wind speed in the rotor plane by controlling at least one of the inclination angle of the at least one blade, electrical recovery torque of the wind turbine generator and orientation of a nacelle as a function of wind speed and direction.

2. A method of controlling a wind turbine as claimed in claim 1, wherein the dynamic wind model is expressed with a relationship:

$$\begin{cases} \begin{bmatrix} \frac{dv_1(t)}{dt} \\ \frac{dv_2(t)}{dt} \end{bmatrix} = \begin{bmatrix} 0 & 1 \\ 0 & 0 \end{bmatrix} \begin{bmatrix} v_1(t) \\ v_2(t) \end{bmatrix} + \begin{bmatrix} 0 \\ \eta(t) \end{bmatrix} \\ v(t) = \begin{bmatrix} 1 & 0 \end{bmatrix} \begin{bmatrix} v_1(t) \\ v_2(t) \end{bmatrix} \end{cases}$$

with $v_1(t)$ being the wind speed in the rotor plane, $v_2(t)$ being a wind speed derivative in the rotor plane, and $\eta(t)$ being a white noise with a zero mean and $v(t)=v_1(t)$.

3. A method of controlling a wind turbine as claimed in claim 2, wherein the dynamic model of the wind turbine is expressed with a relationship:

$$\frac{d\omega(t)}{dt} = \frac{1}{2J}\pi\rho R^3 C_q(\beta(t), \lambda(t))v(t)^2 - \frac{P_g(t)}{J\omega(t)} - \frac{1}{J}T_l(t)$$

with $\omega(t)$ being the rotational speed of the rotor, J being a moment of inertia of a kinematic chain of the wind turbine, $\rho$ being the air density, R being a radius of the rotor, $C_q$ being the power coefficient, $\beta(t)$ being the inclination angle of the blades, $\lambda(t)$ being a ratio of blade tip speed to the wind speed in the rotor plane, $P_g(t)$ being the power generated by the conversion machine of the wind turbine, $v(t)$ being the wind speed in the rotor plane and $T_l(t)$ being the loss torque along the kinematic chain of the wind turbine.

4. A method of controlling a wind turbine as claimed in claim 3, wherein the loss torque Tl(t) is considered to be noise.

5. A method of controlling a wind turbine as claimed in claim 4, wherein the power coefficient $C_q$ is obtained by using a map of the wind turbine.

6. A method of controlling a wind turbine as claimed in claim 3, wherein the power coefficient $C_q$ is obtained by using a map of the wind turbine.

7. A method of controlling a wind turbine as claimed in claim 2, wherein the method determines a longitudinal component of an average wind speed in the rotor plane.

8. A method of controlling a wind turbine as claimed in claim 1, wherein the dynamic model of the wind turbine is expressed with a relationship:

$$\frac{d\omega(t)}{dt} = \frac{1}{2J}\pi\rho R^3 C_q(\beta(t), \lambda(t))v(t)^2 - \frac{P_g(t)}{J\omega(t)} - \frac{1}{J}T_l(t)$$

with $\omega(t)$ being the rotational speed of the rotor, J being a moment of inertia of a kinematic chain of the wind turbine, $\rho$ being air density, R being a radius of the rotor, $C_q$ being a power coefficient, $\beta(t)$ being the inclination angle of the blades, $\lambda(t)$ being a ratio of blade tip speed to the wind speed in the rotor plane, $P_g(t)$ being the power generated by the conversion machine of the wind turbine, $v(t)$ being the wind speed in the rotor plane and $T_l(t)$ being the loss torque along the kinematic chain of the wind turbine.

9. A method of controlling a wind turbine as claimed in claim 8, wherein the loss torque Tl(t) is considered to be noise.

10. A method of controlling a wind turbine as claimed in claim 9, wherein the power coefficient $C_q$ is obtained by using a map of the wind turbine.

11. A method of controlling a wind turbine as claimed in claim 9, wherein the method determines a longitudinal component of an average wind speed in the rotor plane.

12. A method of controlling a wind turbine as claimed in claim 8, wherein the power coefficient $C_q$ is obtained by using a map of the wind turbine.

13. A method of controlling a wind turbine as claimed in claim 12, wherein the method determines a longitudinal component of an average wind speed in the rotor plane.

14. A method of controlling a wind turbine as claimed in claim 8, wherein the method determines a longitudinal component of an average wind speed in the rotor plane.

15. A method of controlling a wind turbine as claimed in claim 1, wherein the method determines a longitudinal component of an average wind speed in the rotor plane.

16. A controlling a wind turbine as claimed in claim 1, wherein the unscented Kalman filter is applied to an equation of state expressed as:

$$\begin{cases} \begin{bmatrix} \frac{dx_1(t)}{dt} \\ \frac{dx_2(t)}{dt} \\ \frac{dx_3(t)}{dt} \end{bmatrix} = \begin{bmatrix} \frac{1}{2J}\pi\rho R^3 C_q\left(\beta(t), \frac{Rx_1(t)}{x_2(t)}\right)x_2(t)^2 - \frac{P_g(t)}{Jx_1(t)} \\ x_3(t) \\ 0 \end{bmatrix} + \begin{bmatrix} \mu_1(t) \\ 0 \\ \mu_2(t) \end{bmatrix} \\ y(t) = [1 \ 0 \ 0]\begin{bmatrix} x_1(t) \\ x_2(t) \\ x_3(t) \end{bmatrix} + \xi(t) \end{cases}$$

with $$x_1(t) = \omega(t), x_2(t) = v(t), x_3(t) = \frac{dv(t)}{dt},$$

$\omega(t)$ being the rotational speed of the rotor, J being a moment of inertia of the kinematic chain of the wind turbine, $\rho$ being the air density, R being a radius of the rotor, $C_q$ being a power coefficient, $\beta(t)$ being an inclination angle of the blades, $P_g(t)$ being the power generated by the conversion machine of the wind turbine, v(t) being the wind speed in the rotor plane, $\mu_1(t)$ and $\mu_2(t)$ being independent white noises with zero means, and y(t) being a measured output identified at the rotor speed $\omega(t)$ corrupted by a white noise.

17. A method of controlling a wind turbine as recited in claim 1, wherein the wind speed is determined by carrying out steps of:
 i) initializing k=0, a state vector $\hat{x}_a(0|0)=m(0)$ and a state of a covariance matrix $P(0|0)=P_0$,
 ii) at any time k different from 0, acquiring the measurements y(k); and
 iii) at any time k different from 0, determining wind speed v(k) in the rotor plane by using equations as follows:

$$K(k) = P(k|k-1)C^T(CP(k|k-1)C^T + R)^{-1}$$

$$\begin{cases} x(k|k) = x(k|k-1) + K(k)(y(k) - Cx(k|k-1)) \\ P(k|k) = (I_3 - K(k)C)P(k|k-1) \end{cases}$$

$$v(k) = [0 \ 1 \ 0]\hat{x}$$

with K being the Kalman filter gain, P being the covariance of a Gaussian noise $\mu$, P(k|k−1) being error variance from the measurements of the time k−1, P(k|k) being error variance from the measurements of the time k, x(k|k) being an estimation of x(k) from the measurements of time k, x(k|k−1) being an estimation of x(k) from the measurements of time k−1, and R being the covariance of a Gaussian noise $\xi$, C=[1 0 0],$I_3$ being a identity matrix of size 3.

18. A tangible computer program product, comprising code instructions for executing steps of the method of controlling a wind turbine as recited in claim 1, when the program is executed by one of a control and diagnosis unit of the wind turbine.

19. A wind turbine, comprising means for measuring the rotational speed of the rotor, means for measuring an inclination angle of the wind turbine blades, means for measuring power generated by a conversion machine of the wind turbine, and means for determining wind speed in a rotor plane of the wind turbine for implementing the method of controlling a wind turbine as recited in claim 1.

20. A wind turbine as claimed in claim 19, comprising a real-time control and data acquisition system including the means for measuring rotational speed of the rotor, the means for measuring the inclination angle of the wind turbine blades and the means for measuring the power generated by the conversion machine of the wind turbine.

* * * * *